United States Patent
Hiscox

[15] 3,652,134
[45] Mar. 28, 1972

[54] ANTI-SKID CONTROL SYSTEM UTILIZING A PUMP CIRCUIT FOR PRODUCING A VOLTAGE DEPENDENT ON FREQUENCY

[72] Inventor: Leonard Remsay Hiscox, Birmingham, England

[73] Assignee: Girling Limited, Tyseley, Birmingham, England

[22] Filed: Mar. 18, 1970

[21] Appl. No.: 20,786

[30] Foreign Application Priority Data

Mar. 31, 1969 Great Britain......................16,673/69

[52] U.S. Cl......................303/21 CG, 188/181 A, 307/233, 307/295, 328/140
[51] Int. Cl. ......................................................B60t 8/12
[58] Field of Search...............188/181; 303/20, 21; 307/233, 307/238, 240, 295, 246, 251, 255, 271, 279, 288, 304, 313; 324/160, 161, 162, 78 E, 78 I, 168; 320/1; 328/140, 127, 136

[56] References Cited

UNITED STATES PATENTS 3,482,887  12/1969  Sheppard..........................303/21 BE Primary Examiner—Milton Buchler
Assistant Examiner—Stephen G. Kunin
Attorney—Holman, Glascock, Downing & Seebold

[57] ABSTRACT

An antiskid control system utilizing a pump circuit for producing a voltage dependent on the frequency of an AC input has a first capacitor across which the output voltage of the circuit is developed and a second capacitor connected to the input terminals of the circuit. Usually in arrangements of this kind the first capacitor receives one pulse for each cycle of the input, but in accordance with the invention two transistors are arranged coupling the capacitors so that the first capacitor receives two charging pulses per cycle.

2 Claims, 1 Drawing Figure

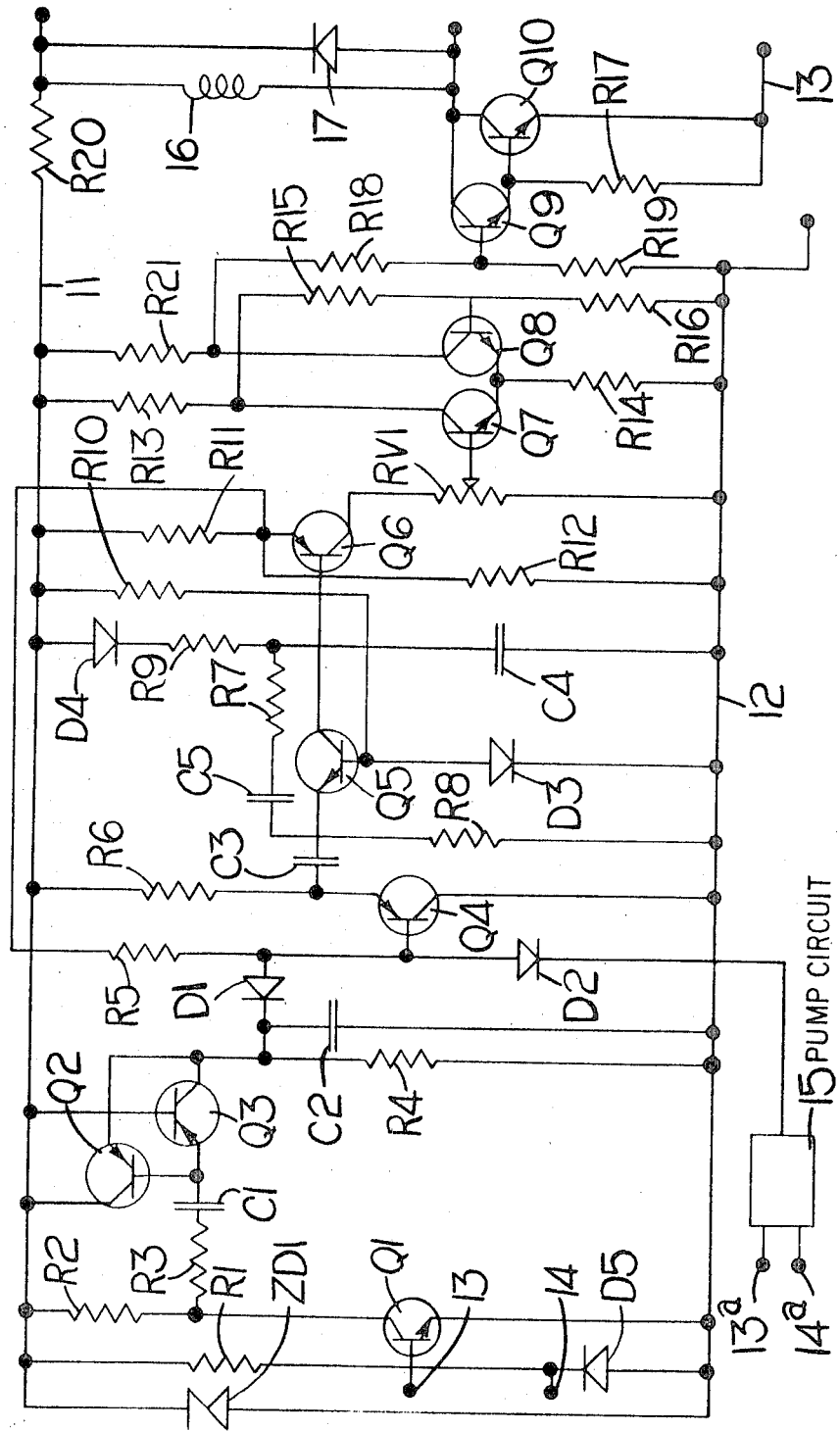

ANTI-SKID CONTROL SYSTEM UTILIZING A PUMP CIRCUIT FOR PRODUCING A VOLTAGE DEPENDENT ON FREQUENCY

This invention relates to pump circuits for producing a voltage dependent on frequency. The invention is particularly applicable to the use of such pump circuits in antiskid control systems for vehicles.

In its broadest aspect, the invention resides in a pump circuit comprising in combination a pair of DC supply lines, an input terminal for connection to an AC source, a first capacitor across which the output voltage of the circuit is developed, a second capacitor connected to the input terminals, and first and second transistors coupling the capacitors and supply terminals whereby the first capacitor receives a charging pulse for each positive and each negative pulse at the input terminal.

As compared with a normal diode pump circuit or transistor pump circuit, the arrangement in accordance with the invention has the advantage that the output from the circuit will have a ripple at twice the frequency and half the amplitude of a conventional arrangement, in which the capacitor providing the output is charged once for each full cycle of the input, that is to say once for each positive and negative pulse at the input. The alternation in ripple content using a circuit in accordance with the invention is advantageous in many applications in that it simplifies the filtering which is necessary. For example, in an antiskid control system for a vehicle where a pump circuit is used to give a speed-dependent signal, which is then differentiated and used to release the brakes to prevent skidding, it is necessary to filter the output from the pump circuit, and moreover some form of switch must be used for cutting out the circuit at very low speeds, because it is found that the ripple can cause unwanted release of the brakes. Using the pump circuit according to the invention, not only is the filter simplified, but the lowest speed obtainable is reduced.

The invention further resides in an antiskid control system for a vehicle, including a pump circuit as specified above, the input to the pump circuit being obtained from a generator driven by the wheel so as to be proportional to the speed of the wheel, a differentiating circuit to which the output from the pump circuit is applied, the output from the differentiating circuit having a magnitude which is dependent on the deceleration of the wheel, and means operable by the output from the differentiating circuit for releasing the brakes if the output from the differentiating circuit exceeds a predetermined value.

The accompanying drawing is a circuit diagram illustrating one example of the invention.

Referring to the drawing, there is provided a positive supply line 11 connected to the positive terminal of a battery or other DC source through a resistor R20, and a pair of negative supply lines 12, 13, the voltage between the lines 11, and 12 being smaller than that between the lines 11 and 13. The voltage between the lines 11 and 12 is stabilized by a Zener diode ZD1, and connected in series between the lines 11, 12 are a resistor R1 and a diode D5. A generator driven by a wheel of a vehicle, for example a rail vehicle, supplies an AC signal to a pair of terminals 13, 14, this signal having a frequency proportional to the speed of the wheel. The terminal 14 is connected to the junction of the resistor R1 and diode D5, and the terminal 13 is connected to the base of an n-p-n transistor Q1, the emitter of which is connected to the line 12 and the collector of which is connected to the line 11 through a resistor R2. The collector of the transistor Q1 is further connected through a resistor R3 and a capacitor C1 in series to the base of a p-n-p transistor Q2 and to the emitter of a p-n-p transistor Q3. The transistor Q2 has its collector connected to the line 11 and its emitter connected to the collector of the transistor Q3. The transistor Q3 has its base connected to the line 11, and its collector connected to the line 12 through a resistor R4 and a capacitor C2 in parallel. The collector of the transistor Q3 is further connected through a diode D1 to the base of a p-n-p transistor Q4.

The circuit can be used to monitor two wheels at the same time, the generator associated with the second wheel providing an AC output to terminals 13a, 14a to which is connected a circuit similar to that thus far described and indicated at 15. The circuit 15 provides an output through the diode D2, equivalent to the diode D1, to the base of the transistor Q4.

The transistor Q4 has its collector connected to the line 12 and its emitter connected through a resistor R6 to the line 11, and further connected through a capacitor C3 and a resistor R8 in series to the line 12. The junction of the capacitor C3 and resistor R8 is connected to the emitter of an n-p-n transistor Q5, the base of which is connected through a diode D3 to the line 12 and through a resistor R10 to the line 11. The collector of the transistor Q5 is connected to the line 12 through a capacitor Q4 and to the line 11 through a resistor R9 and D4 in series, and the emitter and collector of the transistor Q5 are interconnected through a capacitor C5 and resistor R7 in series. A further connection is made from the collector of the transistor Q4 to the base of a p-n-p transistor Q6 having its collector connected to the line 12 through a resistor RV1, and its emitter connected to the line 12 through a resistor R12, to the line 11 through a resistor R11, and to the base of the transistor Q4 through a resistor R5.

A variable point on the resistor RV1 is connected to the base of an n-p-n transistor Q7, the collector of which is connected to the line 11 through a resistor R13, the emitter of the transistor Q7 is connected to the emitter of an n-p-n transistor Q8, and both emitters are connected to the line 12 through a resistor R14. The base of the transistor Q8 is connected to the junction of a pair of resistors R15, R16 connected between the collector of the transistor Q7 and the line 12, and the collector of the transistor Q8 is further connected through a pair of resistors R18, R19 in series to the line 12. The junction of the resistors R18, R19 is connected to the base of an n-p-n transistor Q9, the emitter of which is connected to the base of an n-p-n transistor Q10 and is further connected through a resistor R17 to the line 13, the line 13 being further connected to the emitter of the transistor Q10. The collectors of the transistors Q9, Q10 are connected to the line 11 through a solenoid 16 and the resistor R20 in series, the solenoid 16 being shunted by a diode 17. The solenoid 16 when energized, releases the brakes of the vehicle.

The pump circuit comprises the capacitor C1 and capacitor C2, the transistors Q2 and Q3 and the resistor R4, the input to the pump circuit being by way of the resistor R3 and the output being taken by way of the diode D1. The generator driven by the wheel turns the transistor Q1 on and off, so that the input to the capacitor C1 is alternately negative and positive in polarity. When the transistor Q1 is conducting, the capacitor C1 charges by way of the collector and base of the transistor Q2 and the resistor R3 and transistor Q1. The transistor Q2 has its normal emitter and collector functions reversed. While the capacitor C1 is charging, the transistor Q2 conducts between its collector and emitter to apply a pulse to the capacitor C2. When the transistor Q1 turns off, the input to the capacitor C1 is at the voltage of the positive line, and so the plate of the capacitor C1 connected to the base of the transistor Q2 will be at a positive voltage greater than that of the positive line, which will turn on the transistor Q3 because the base of the transistor Q3 will now be negative with respect to its emitter. The resultant conduction of the transistor Q3 transfers a further pulse of energy to the capacitor C2. Thus, a voltage is developed across the capacitor C2 which is proportional to the frequency of the signal appearing at the terminals 13, 14. The ripple on the signal across the capacitor C2 will have twice the frequency and half the amplitude of known pump circuits in which the output capacitor receives only one pulse for each full cycle of the input.

In normal operation current flows through the resistor R6 and the emitter-base circuit of the transistor Q4, and through the diodes D1 and D2 so that these diodes are normally conducting. In the event of the wheel associated with terminals 13, 14 skidding, the capacitor C2 will cause a falling potential to be applied to the base of the transistor Q4 by way of its associated diode D1. If the other wheel skids, a falling potential will be applied from the equivalent capacitor C2 in the circuit 15 by way of the diode D2. Because both diodes are conducting already, there is no delay, and it would further be appreciated when a skid occurs, the circuit operates in response to the current flowing through one of the diodes only, the other diode then effectively being blocked. The transistor Q4 acts as an emitter follower and passes a signal by way of the differentiating capacitor C3 into the emitter of the transistor Q5, which acts as an amplifier in common base configuration. The resistor R5 sharpens the leading edge of the pulse. The capacitor C5 and resistor R7 conduct ripple, and the diode D4 stabilises the operation of the following amplifier stage Q6, which operates to provide in the resistor RV1 a current which is proportional to the deceleration. As long as the deceleration is at an acceptable level so that wheel skid is unlikely to occur. the transistor Q7 is off, the transistor Q8, which forms with the transistor Q7 a Schmitt trigger is on, so that base current is removed from the transistor Q9 and transistors Q9 and Q10 are both off so that the solenoid 16 is deenergized and the brakes can be applied in the usual way. However, when the deceleration reaches a level at which wheel skid is likely to occur, the current flowing through the resistor RV1 reaches a value, which is preset by the tapping on the resistor RV1, at which the transistor Q7 conducts, the transistor Q8 turns off, current flows through the resistor R21 and resistor R18 to turn on the transistor Q9 and the transistor Q10, so that the solenoid 16 is deenergized to release the brakes. The arrangement of course operates if either wheel is liable to slip, by virtue of the circuit 15.

I claim:

1. An anti-skid control system for a vehicle having a wheel to be controlled, including a generator driven by the wheel so as to produce an a.c. output the frequency of which is proportional to the speed of the wheel, a pump circuit to which the output from the generator is applied, said pump circuit producing an output voltage dependent on frequency and comprising in combination a pair of d.c. supply lines, an input terminal for connection to the generator output voltage, a first capacitor across which the output voltage of the pump circuit is developed, a second capacitor connected to the input terminal, and first and second transistors coupling the capacitors and supply terminals whereby the first capacitor receives a charging pulse for each positive and each negative pulse at the input terminal, said control system further including a differentiating circuit to which the output from the pump circuit is applied, the output from the differentiating circuit having a magnitude which is dependent on the deceleration of the wheel, and means operable by the output from the differentiating circuit for releasing the brakes if the output from the differentiating circuit exceeds a predetermined value.

2. An anti-skid control system as claimed in claim 1 in which said pump circuit includes a third transistor having its base coupled to the input terminal and its collector and emitter connected to the supply lines, the third transistor turning on and off so that the input to the second capacitor is alternately negative and positive, a negative input to the second capacitor causing it to charge by way of the base of the first transistor, which conducts to charge the first capacitor, and a positive input to the second capacitor causing it to turn on the second transistor and supply a further pulse to the first capacitor.

* * * * *